United States Patent [19]

Myers

[11] 4,391,160
[45] Jul. 5, 1983

[54] SUPPORT ASSEMBLY HAVING RELEASABLE LEVER MOUNTING FOR HANDLE BAR

[76] Inventor: John E. Myers, Star Rte., Echo, Oreg. 97826

[21] Appl. No.: 205,316

[22] Filed: Nov. 10, 1980

[51] Int. Cl.³ .............................................. B62K 21/12
[52] U.S. Cl. ................................ 74/551.8; 248/475 B; 248/230; 403/328
[58] Field of Search ...................... 74/551.8, 488, 489; 248/475 B, 230; 403/328

[56]     References Cited
U.S. PATENT DOCUMENTS 2,874,587  2/1959  Schmid .................................. 74/488
3,733,922  5/1973  Tripp ..................................... 74/523
3,918,323  11/1975  Prager .................................. 74/551.8

Primary Examiner—Kenneth Dorner
Attorney, Agent, or Firm—Kolisch, Hartwell & Dickinson

[57]     ABSTRACT

A support assembly for a control lever on a cycle handle bar which includes a mounting releasably locked in place by a spring-biased indent-detent mechanism. The mounting is releasable with a jarring force exerted on it to permit displacement circumferentially and axially on the bar. The assembly also includes a sleeve encircling and securable to the bar and a collar integral with the sleeve to prohibit axial movement of the mounting in one direction. A base portion in the mounting encircles the sleeve and a post used in mounting a control lever, projects laterally from the base portion.

3 Claims, 3 Drawing Figures

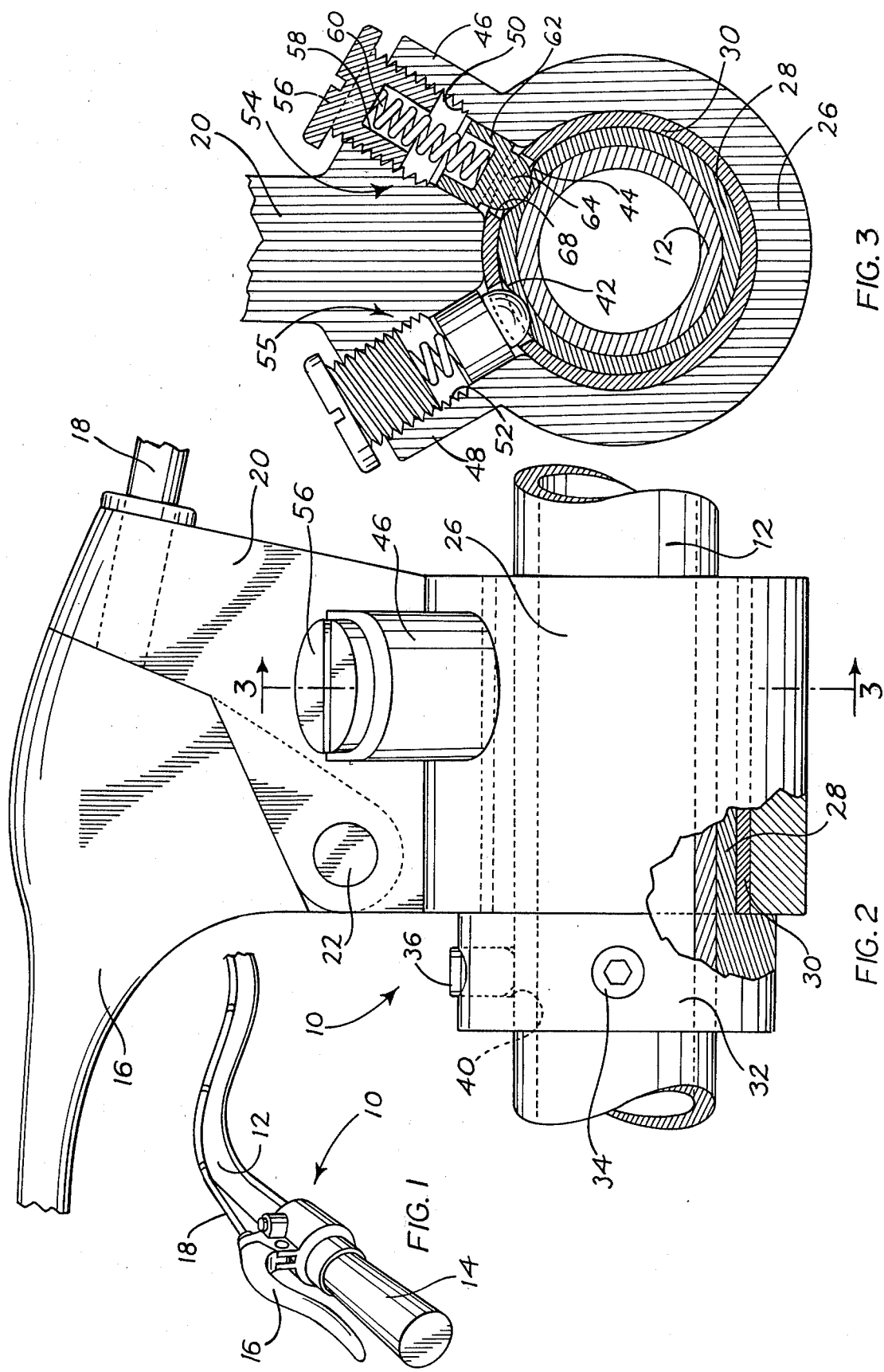

SUPPORT ASSEMBLY HAVING RELEASABLE LEVER MOUNTING FOR HANDLE BAR

BACKGROUND AND SUMMARY OF THE INVENTION

This invention pertains to a support assembly for releasably securing mechanical devices to a bar, and more particularly, to such an assembly which includes a mounting for a control lever on a cycle handle bar which is releasably locked in place by a spring-biased indent-detent mechanism. The assembly also includes a sleeve encircling and securable to the bar and a collar integral with the sleeve to prohibit axial movement of the mounting in one direction. A base portion in the mounting encircles the sleeve and a post used in mounting a control lever, projects laterally from the base portion.

In motorcycles, clutches and brakes are many times actuated by a pivoted lever attached to a mounting rigidly fastened to a handle bar adjacent a hand grip. These levers and mountings are prone to damage when the motorcycle inadvertently falls on its side. The usual force exerted on the lever in such a case is one tending to cause it to be displaced circumferentially on the handle bar as well as axially in a direction extending away from the hand grip.

A general object of the present invention is to provide a support assembly for releasably securing mechanical devices on a bar. Specifically, when a jarring force is applied to the device, its mounting will release from a normal, locked position and move circumferentially to and/or axially with the bar in the general direction of the force applied.

More particularly, the present invention proposes such a support assembly for a control lever on a cycle handle bar, which includes a mounting releasably locked in position with a spring-biased indent-detent mechanism.

It is a further object of this invention to provide a mounting which after having been displaced from its normal, locked position, is relatively easily reinstalled.

It can be seen that a support assembly including a releasably lockable mounting for attaching a control lever to a cycle handle bar provides a means for avoiding damage to the control lever when a jarring force is applied. Since no damage is done to the mounting when it is displaced on the bar, it may be returned to its locked position on the handle bar for continued use.

These and other objects and advantages which are attained by the invention will become more fully apparent as the description which now follows is read in conjunction with the accompanying drawings.

DESCRIPTION OF THE DRAWINGS

FIG. 1 is a perspective view of a preferred embodiment of this invention connected to a control lever and mounted near a left hand grip on a motorcycle handle bar.

FIG. 2 is a side view of the support assembly shown in FIG. 1 taken transversely to the longitudinal axis of the handle bar.

FIG. 3 is a transverse cross-sectional view taken generally along line 3—3 in FIG. 2 to show the details of the spring-biased indent-detent mechanism.

DETAILED DESCRIPTION OF THE INVENTION

Turning now to FIG. 1, indicated generally at 10 is a support assembly made in accordance with this invention in a typical position on a handle bar 12 adjacent a hand grip 14 of a motorcycle. A mechanical device or other operative instrumentality, shown here as a control lever 16 which typically actuates a brake or clutch, is shown attached to assembly 10. A conventional cable 18 is connected to lever 16 so that when such is moved downwardly in FIG. 1, the cable is shifted to actuate the instrumentality connected to the cable.

FIGS. 2, 3 show detailed views of assembly 10 in operative position on handle bar 12. Means for pivotally mounting lever 16 on a post 20 which projects laterally away from bar 12 is shown at pivot 22. Integrally attached to post 20 is a tubular base portion 26 which encircles handle bar 12. Interposed between base portion 26 and bar 12 is an annular sleeve 28. Interposed between sleeve 28 and base portion 26 is a nylon anti-friction tubular bushing 30.

Sleeve 28 is secured on bar 12 by anchoring a collar 32 which is an integral part of sleeve 28 to bar 12 using screws 34, 36. Collar 32 has a pair of radially directed threaded bores, such as bore 40, sized for receipt of screws 34, 36. The outer diameter of collar 32 is greater than that of sleeve 28. Sleeve 28 has a pair of bowl-shaped cavities, 42, 44, as shown in FIG. 3, positioned for receipt of a pair of detents to be described subsequently.

Joining and extending laterally from base 26 is a pair of similar upstanding bosses, 46, 48 having axially extending bores 50, 52, respectively. Within each bore is a detent assemblage shown generally at 54, 55 for bosses 46, 48 respectively. The distal end of bore 50 is threaded for receipt of a screw 56. The bottom end of screw 56 has a bore 58 sized for receipt of the top end of a compression spring 60. The bottom end of spring 60 bears on the inside of the closed end of a hollow cylinder 62 whose external diameter is less than the diameter of bore 50.

Joined to and integral with the underside of the closed end of cylinder 62 is a hemispherical portion 64 which is urged into cavity 44 by spring 60. Hemisphere 64 extends within a bore 68 in bushing 30 whose diameter is less than that of cylinder 62. Thus, the shoulders of cylinder 62 rest on bushing 30 when base portion 26 is displaced from sleeve 28.

The combination of detent 54 and cavity 44 is also referred to herein as means releasably locking base portion 26 to sleeve 28 or as releasable spring-biased indent-detent means.

Screw 56 is adjustable to adjust the bias of spring 60 to provide proper release of mounting 10 when post 20 receives a jarring force.

FIGS. 1-3 show assembly 10 with base portion 26 in a locked position allowing normal use of the control lever in operation of a motorcycle. In a case where the cycle inadvertently falls and a jarring force is applied to the control lever, the detent hemispheres are displaced out of the cavities. Base portion 26 is thereby enabled to displace circumferentially to and/or axially with bar 12. Collar 32 inhibits displacement toward the left in the configuration shown in FIG. 2. The mounting may be returned to its locked position by sliding base portion 26 over sleeve 28 until it abuts collar 32 and then by rotating it circumferentially until the hemispheres reseat in the cavities.

It can be seen that the preferred embodiment just described made in conformance with this invention provides a support assembly for a cycle control lever which includes a mounting held in a fixed position during normal operation. The mounting displaces from that position when subjected to a jarring force without sustaining significant damage. Also, it is relatively easily returned to the fixed position.

It can be seen that variations in the construction of a support assembly made in conformance with this invention could include the attachment of devices other than a control lever or utilize other configurations for releasably locking the mounting to a handle bar.

Thus, while a preferred embodiment of the invention has been described herein, it is appreciated that variations and modifications may be made without departing from the spirit of the invention.

It is claimed and desired to secure by Letters Patent:

1. A support assembly for securing a mechanical device on a bar comprising
   an annular sleeve for encompassing and fixable to such bar,
   a tubular base portion encompassing said sleeve,
   a post laterally projecting from and integral with said base portion adapted for attaching to such device,
   releasable means releasably locking said base portion to said sleeve, said base portion being movable relative to said sleeve with release of said releasable means, and
   a tubular bushing positioned between said sleeve and said base portion for facilitating movement of said base portion relative to said sleeve with release of said locking means.

2. In combination with a cycle handle bar,
   a sleeve encircling said bar adjacent an end of said bar, said sleeve having one end facing said bar end and an opposite end, means securing said sleeve to said bar,
   a collar integral with said sleeve adjacent said sleeve's one end,
   a base portion abutting said collar and encircling said sleeve in a region of said sleeve located toward said sleeve's opposite end,
   releasable spring-biased indent-detent means operatively interposed between and releasably locking said base portion to said sleeve,
   a post integral with said base portion projecting laterally of said base portion,
   a control lever, and
   means pivotally mounting the control lever on said post.

3. A cycle control and support assembly therefor adapted to be mounted on a cycle handle bar adjacent an end thereof comprising:
   an annular sleeve for snuggly encompassing the handle bar,
   said sleeve having one end and are opposite end,
   a collar at said one end of the sleeve securely joined to the sleeve,
   means for securing the sleeve and collar to a handle bar with the sleeve and collar held immovably on the handle bar and with the sleeve's said one end closer to the end of the handle bar than the sleeve's opposite end,
   a tubular base portion encircling said sleeve and abutting said collar, said base portion being relatively movable in a direction extending circumferentially on the sleeve and in a direction extending axially on the sleeve in a direction away from said collar,
   a post laterally projecting from and integral with said base portion,
   a control lever and means pivotally mounting the control lever on said post, and
   releasable means releasably locking said base portion to said sleeve, thus to prevent relative circumferential and axial movement, but releasable under a sharp impact to permit such movement.

* * * * *